(12) United States Patent
Lee et al.

(10) Patent No.: US 9,419,464 B2
(45) Date of Patent: Aug. 16, 2016

(54) WIRELESS CHARGING SYSTEM

(71) Applicant: Samsung Electro-Mechanics Co., Ltd., Suwon-si (KR)

(72) Inventors: Hyun Seok Lee, Seoul (KR); Jeong Ho Yoon, Suwon-si (KR); Jun Ki Min, Suwon-si (KR); Kwang Du Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 604 days.

(21) Appl. No.: 13/626,798

(22) Filed: Sep. 25, 2012

(65) Prior Publication Data

US 2013/0082650 A1    Apr. 4, 2013

(30) Foreign Application Priority Data

Sep. 30, 2011  (KR) .......................... 10-2011-0099935

(51) Int. Cl.
*H02J 7/00* (2006.01)
*H02J 7/02* (2016.01)
*H02J 17/00* (2006.01)

(52) U.S. Cl.
CPC *H02J 7/025* (2013.01); *H02J 17/00* (2013.01)

(58) Field of Classification Search
USPC ....................................................... 320/108
See application file for complete search history.

(56) References Cited

U.S. PATENT DOCUMENTS

| | | | | |
|---|---|---|---|---|
| 2010/0244576 A1* | 9/2010 | Hillan | ................. | G06K 7/0008 307/104 |
| 2010/0270867 A1* | 10/2010 | Abe | ....................... | H02J 5/005 307/104 |
| 2010/0328044 A1* | 12/2010 | Waffenschmidt | ....... | H02J 7/025 340/10.4 |
| 2011/0260681 A1* | 10/2011 | Guccione | ............. | H02J 7/0054 320/108 |
| 2012/0242160 A1* | 9/2012 | Tseng | .................. | H04B 5/0037 307/104 |

FOREIGN PATENT DOCUMENTS

| | | |
|---|---|---|
| KR | 10-2000-0005825 A | 1/2000 |
| KR | 20-2010-0010648 | 10/2010 |
| KR | 10-2010-0125755 A | 12/2010 |

* cited by examiner

*Primary Examiner* — Mohammed Alam
(74) *Attorney, Agent, or Firm* — NSIP Law

(57) ABSTRACT

Disclosed herein is a wireless charging system that includes a transmission device including a primary coil and a reception device including a secondary coil, wherein the transmission device determines the presence or absence of the reception device upon receiving the remaining amount of current supplied from the primary coil to the secondary coil, and controls a voltage input to the primary coil based on the determination results. The wireless charging system can generate a sensing signal for determining the presence and absence of the reception device by measuring the amount of current applied from the transmitter coil to the receiver coil through the detection unit. Thus, the receiver controller of the wireless charging system can accurately determine whether to transmit power by comparing the sensing signal provided from the detection unit with a reference signal, thus reducing power consumption.

16 Claims, 3 Drawing Sheets

WIRELESS CHARGING SYSTEM

CROSS REFERENCE(S) TO RELATED APPLICATIONS

This application claims the benefit under 35 U.S.C. Section 119 of Korean Patent Application Serial No. 10-2011-0099935, entitled "Wireless Charging System" filed on Sep. 30, 2011, which is hereby incorporated by reference in its entirety into this application.

BACKGROUND OF THE INVENTION

1. Technical Field

The present invention relates to a wireless charging system and, more particularly, to a wireless charging system capable of reducing waste of power.

2. Description of the Related Art

Recently, research on a wireless power transfer technique that allows convenient supplying or charging power without having connection of an electric wire to various electronic devices has been actively ongoing, such that the field for the wireless power transfer technology is rapidly growing.

The wireless power transfer technique has expended from a scheme of wirelessly charging personal terminals to a technique of wirelessly charging vehicle batteries.

The wireless power transfer technique field is classified into three schemes, i.e., an inductive coupling scheme, an evanescent wave resonance scheme, and a radio frequency (RF) scheme, and currently, the inductive coupling scheme is commonly used because it is very effective.

The inductive coupling scheme has the same basic principle as that of a transformer, and, in a wireless charging system, primary and secondary coils of a transformer are separately used. Namely, the primary coil is used in a charging device (referred to as a 'transmission device', hereinafter) and the secondary coil is mounted in a terminal (referred to as a 'reception device', hereinafter) so as to be used.

In designing a wireless charging system using the inductive coupling scheme, an induction of current between coils is closely related to the efficiency of the overall system, so the wireless charging system should be designed in consideration of the coil characteristics and matching of the transmitter and the receiver.

In addition, an unnecessary waste of power at the transmission device's side should be necessarily reduced by determining the presence or absence of the reception device on a transmission device pad; namely, transmitting power when the reception device is present thereon and preventing power supply in the absence of the reception device.

SUMMARY OF THE INVENTION

An object of the present invention is to provide a wireless charging system capable of reducing a waste of power.

According to an exemplary embodiment of the present invention, there is provided a wireless charging system that includes a transmission device including a primary coil and a reception device including a secondary coil, wherein the transmission device determines the presence or absence of the reception device upon receiving a feedback remaining amount of a current supplied from the primary coil to the secondary coil, and controls a voltage input to the primary coil based on the determination results.

The transmission device may include: a detection unit generating a sensing signal for determining the presence or absence of the reception device upon receiving the remaining amount of current; and a transmitter controller comparing the sensing signal supplied from the detection unit with a pre-set comparison signal, and generating a control signal for determining the level of a voltage input to the primary coil based on the comparison results.

When the remaining amount of current is gradually reduced, the detection unit may generate the sensing signal indicating that the reception device is present.

When the remaining amount of current is gradually increased, the detection unit may generate the sensing signal indicating that the reception device is not present.

According to another exemplary embodiment of the present invention, there is provided a wireless charging system that includes a transmission device including a primary coil and a reception device including a secondary coil, wherein the transmission device includes a power source unit generating charging power by using an external power source; a power amplifier (PA) driving unit amplifying a high frequency from the charging power generated by the power source unit; a detection unit electrically connected with the primary coil and generating a sensing signal upon receiving a feedback remaining amount of a current supplied from the primary coil to the secondary coil; and a controller comparing the sensing signal provided from the detection unit with a reference signal and generating a control signal for driving the PA driving unit based on the comparison results.

The detection unit may include: an isolation unit preventing interference with main power when the remnant of the amount of current is fed back from the primary coil; a sensing unit having one end connected with the isolation unit and sensing the remaining amount of current supplied from the isolation unit to generate a measurement signal; a comparison unit comparing an input signal provided from the isolation unit with the measurement signal provided from the sensing unit to generate a comparison signal; and a calculation unit digitalizing the comparison signal output from the comparison unit to generate the sensing signal.

The isolation unit may be a transformer.

The sensing unit may be configured as a resistor, and one end of the resistor may be connected with the isolatoin unit and the other end of the resistor may be connected with any one of the input terminals of the comparison unit.

When the remaining amount of current is gradually reduced, the detection unit may generate the sensing signal indicating that the reception device is present.

When the remaining amount of current is gradually increased, the detection unit may generate the sensing signal indicating that the reception device is not present.

When the sensing signal is smaller than the reference signal, the controller may recognize that the reception device is present, and generate the control signal for activating the PA driving unit.

When the sensing signal is greater than the reference signal, the controller may recognize that the reception device is not present, and generate the control signal for deactivating the PA driving unit.

According to another exemplary embodiment of the present invention, there is provided a charging method of a wireless charging system that includes a transmission device including a primary coil and a reception device including a secondary coil, including: generating a sensing signal upon receiving a feedback remaining amount of a current supplied from the primary coil to the secondary coil; comparing the sensing signal with a pre-set reference signal; and controlling a voltage input to the primary coil based on the comparison results.

In generating of the sensing signal, when the remaining amount of current is gradually reduced, the sensing signal indicating that the reception device is present may be generated.

In generating of the sensing signal, when the remaining amount of current is gradually increased, the sensing signal indicating that the reception device is not present may be generated.

In comparing of the sensing signal, when the sensing signal is smaller than the reference signal, the presence of the reception device may be recognized and the control signal for activating the PA driving unit may be generated.

In comparing of the sensing signal, when the sensing signal is greater than the reference signal, the absence of the reception device may be recognized and the control signal for deactivating the PA driving unit may be generated.

The comparison signal may be a signal, which is generated in the transmission device in a state in which the reception device is not present, stored as a default value.

DESCRIPTION OF THE PREFERRED EXEMPLARY EMBODIMENTS

Hereinafter, exemplary embodiments of the present invention will be described with reference to the accompanying drawings. However, the exemplary embodiments are described by way of examples only and the present invention is not limited thereto.

In describing the present invention, when a detailed description of well-known technology relating to the present invention may unnecessarily make unclear the spirit of the present invention, a detailed description thereof will be omitted. Further, the following terminologies are defined in consideration of the functions in the present invention and may be construed in different ways by the intention of users and operators. Therefore, the definitions thereof should be construed based on the contents throughout the specification.

As a result, the spirit of the present invention is determined by the claims and the following exemplary embodiments may be provided to efficiently describe the spirit of the present invention to those skilled in the art.

A wireless charging system according to exemplary embodiments of the present invention will be described with reference to the accompanying drawings.

Figure 1:
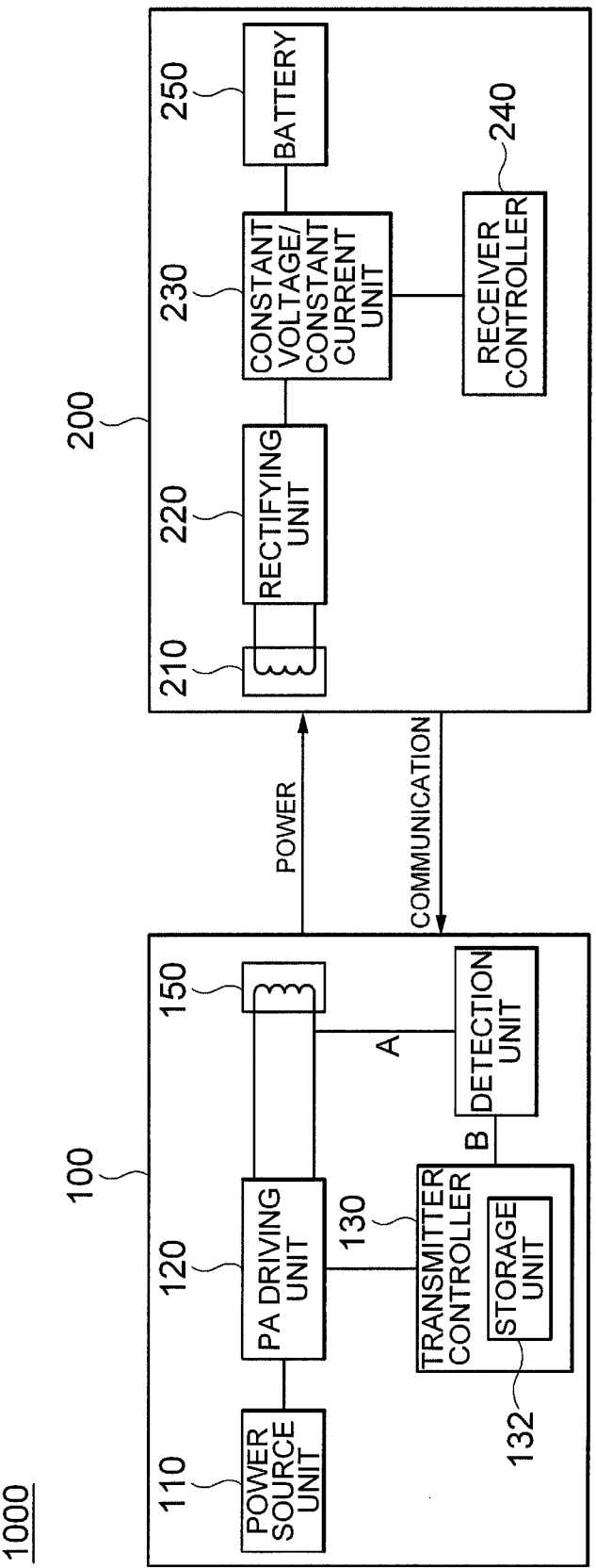
FIG. 1 is a schematic block diagram of a wireless charging system according to an exemplary embodiment of the present invention.

FIG. 1 is a schematic block diagram of a wireless charging system according to an exemplary embodiment of the present invention.

As shown in FIG. 1, a wireless charging system 1000 according to an exemplary embodiment of the present invention includes a transmission device (TX) 100 and a reception device (RX) 200. Here, the wireless charging system 1000 according to an exemplary embodiment of the present invention may use an inductive coupling scheme having the same basic principle as that of a transformer.

The transmission device 100 is a means corresponding to a charging device, and transmits optimum power to the reception device 200 to charge the reception device 200. Here, the transmission device 100 may generate an inductive magnetic field to generate inductive power, and supply the generated inductive power to a mobile device, i.e., the reception device 200.

The transmission device 100 may include a power source unit 110, a power amplifier (PA) driving unit 120, a transmitter controller 130, and a detection unit 140.

The power source unit 110 may generate charging power by using external power source, and supply the generated charging power to the PA driving unit 120. In general, external power source supplies AC power, so the power source unit 110 may convert the AC power into DC power and transfer the converted DC power to the PA driving unit 120.

The PA driving unit 120 may amplify high frequency from the DC power applied from the power source unit 110 and supply the same to a transmitter coil 150.

In this case, when a DC voltage is applied to a primary coil, i.e., the transmitter coil 150, a static magnetic field is formed in the transmitter coil 150 to allow the transmitter coil 150 to have qualities like an electromagnet, and a magnetic material within the transmitter coil 150 is internally magnetized to have magnetism. According to the strength of the DC voltage, the DC voltage may be applied up to a secondary coil, i.e., a receiver coil 210, of the reception device 200 in contact with the transmission device 100, and a magnetic material within the receiver coil 210 is also internally magnetized to have magnetism, making the transmitter coil 150 and the receiver coil 210 aligned. Here, the strength of the DC voltage may be determined by the transmitter controller 130.

The transmitter controller 130 may generate a control signal C for controlling driving of the PA driving unit 120 based on the sensing signal B detected from the detection unit 140.

In detail, the transmitter controller 130 may compare a sensing signal B provided from the detection unit 140 and a pre-set reference signal, and determine the presence and absence of the reception device 200 based on the comparison results. Also, the transmitter controller 130 may generate the control signal C for controlling driving of the PA driving unit 120 based on the results of the presence and absence determination, to thus determine whether to supply power to the reception device 200.

In addition, the transmitter controller 130 may include a storage unit 132, and the storage unit 132 may store the pre-set reference signal. Here, the reference signal is a signal A generated in the transmission device 100 in a state in which the reception device 200 is not present, which is stored as a default value. The reference signal is a signal arbitrarily set by a designer, which is obtained through experimentation.

The detection unit 140 may generate the sensing signal B for determining the presence and absence of the reception device 200 upon measuring the amount of current applied from the transmitter coil 150 to the receiver coil 210.

In detail, when the reception device 200 is present, the amount of current transmitted from the transmitter coil 150 to the receiver coil 210 is increased to be more than a reference value, and accordingly, the amount (A) of current fed back to the detection unit 140 is gradually reduced. Then, the detection unit 140 may generate a first level sensing signal B indicating that the reception device 200 is present and supply the generated first level sensing signal B to the transmitter controller 130.

Meanwhile, when the reception device 200 is not present, the amount of current transmitted from the transmitter coil 150 to the receiver coil 210 is reduced to be less than the reference value, increasing the amount (A) of current fed back to the detection unit 140. Then, the detection unit 140 may generate a second level sensing signal B indicating that the reception device 200 is not present, and supply the generated second level sensing signal B to the transmitter controller 130.

The detection unit 140 according to an exemplary embodiment of the present invention will be described later in detail with reference to FIG. 2.

Meanwhile, the reception device 200 according to an exemplary embodiment of the present invention is an object to be charged, such as a mobile terminal, or the like. When the reception device 200 is required to be charged, it is brought into contact with the transmission device 100, and immediately when the reception device 200 is in contact with the transmission device 100, it may be provided with power from the transmission device 100.

The reception device 200 may include a rectifying unit 220 rectifying a voltage received through the receiver coil 210 from the transmission device 100, a constant voltage/constant current unit 230 generating a constant voltage and a constant current to be charged in a battery 250 by using the rectified voltage received from the rectifying unit 220 and supplying the generated constant voltage and the constant current to the battery 250, and a receiver controller 240 controlling the constant voltage/constant current unit 230.

In this manner, the wireless charging system 1000 according to an exemplary embodiment of the present invention can measure the amount of current applied from the transmitter coil 150 through the detection unit 140 to the receiver coil 210 to generate the sensing signal B for determining the presence or absence of the reception device 200. In addition, the wireless charging system 1000 can accurately determine whether to transmit power by comparing the sensing signal B provided from the detection unit 140 through the transmitter controller 130 with a reference signal, thus reducing power consumption.

Figure 2:
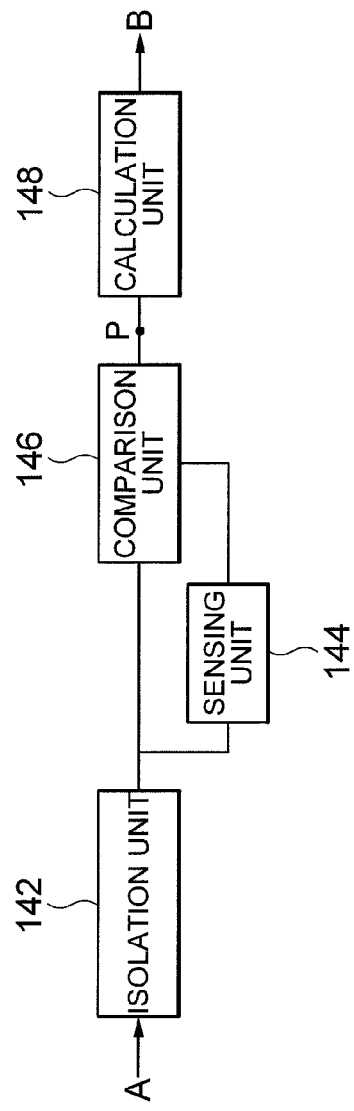
FIG. 2 is a detailed block diagram of a detection unit of the wireless charging system according to an exemplary embodiment of the present invention.

FIG. 2 is a detailed block diagram of a detection unit of the wireless charging system according to an exemplary embodiment of the present invention.

As shown in FIG. 2, the detection unit 140 according to an exemplary embodiment of the present invention may measure the amount (A) of current applied from the transmitter coil 150 to the receiver coil 210 to generate the sensing signal B for determining the presence or absence of the reception device 200.

The detection unit 140 may include an isolation unit 142, a sensing unit 144, a comparison unit 146, and a calculation unit 148.

The isolation unit 142 serves to prevent interference with the main power when a current is fed back to the detection unit 140. For example, the isolation unit 142 may be configured as a transformer.

The sensing unit 144 may be configured as, for example, a resistor (not shown). One end of the resistor is connected with the isolation unit 142 and the other end thereof is connected with one of two input terminals of the comparison unit 146.

The amount of current flowing at both ends of the sensing unit 144 changes according to the presence or absence of the reception device 200 and the corresponding results may be indicated by the comparison unit 146.

Namely, when the reception device 200 is present, the amount of current transmitted from the transmitter coil 150 to the receiver coil 210 is increased to be more than a reference value, and accordingly, the amount (A) of current fed back to the detection unit 140 is gradually reduced. Then, the amount of current flowing through the sensing unit 144 is reduced, so the detection unit 140 may generate the sensing signal B indicating that the reception device 200 is present, and supply the generated sensing signal B to the transmitter controller 130.

Meanwhile, when the reception device 200 is not present, the amount of current transmitted from the transmitter coil 150 to the receiver coil 210 is reduced to be less than the reference value, and accordingly, the amount (A) of current fed back to the detection unit 140 is increased. Then, the amount of current flowing through the sensing unit 144 is increased, so the detection unit 140 may generate the signal B indicating that the reception device 200 is not present, and supply the generated signal B to the transmitter controller 130.

The comparison unit 146 may receive an input signal and a measurement signal, compare them, and output a comparison result to the calculation unit 148. Here, since the input signal is a signal input from the isolation unit 142 and the measurement signal is a signal input through the sensing unit 144, there is a difference between voltages input to both input terminals of the comparison unit 146 according to the presence or absence of the reception device 200, so the comparison unit 146 may generate a comparison signal based on the difference in voltage.

The calculation unit 148 may digitalize the comparison signal transmitted from the comparison unit 146 and provide the digitalized comparison signal to the transmitter controller 130. Here, the calculation unit 148 may be configured as, for example, an analog-to-digital converter (ADC).

In this manner, the detection unit 140 according to an exemplary embodiment of the present invention can measure the amount of current applied from the transmitter coil 150 to the receiver coil 210 and generate the sensing signal B for determining the presence or absence of the reception device 200.

Accordingly, the wireless charging system 1000 can accurately determine whether to transmit power by comparing the sensing signal B provided from the detection unit 140 through the transmitter controller 130 with a reference signal, thus reducing power consumption.

Figure 3:
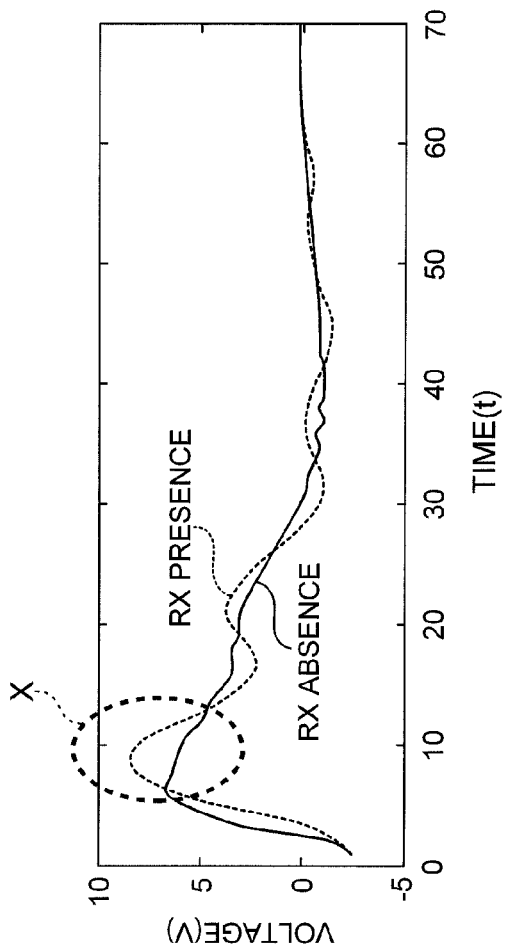
FIG. 3 is a graph showing a waveform at a point P in FIG. 2.

FIG. 3 is a graph showing a waveform at a point P in FIG. 2.

A horizontal axis of the graph indicates time, and a vertical axis of the graph indicates a voltage level. A dotted line on the graph is a waveform at a point P of the detection unit 140 when the reception device 200 is not present, and a solid line is a waveform at the point P when the reception device 200 is present.

As shown in FIG. 3, in the wireless charging system 1000 according to an exemplary embodiment of the present invention, it is noted that there is a difference between the sensing signals output according to the presence and absence of the reception device 200. Thus, the transmitter controller 130 may store data, i.e., a reference signal, when the reception device 200 is not present, as a default value, and compare the sensing signal B, sensing data, when the reception device 200 is located (or present), with the reference signal upon receiving the sensing signal B from the detection unit 140.

Also, as shown in FIG. 3, signals may be sampled in the area X, in which sensing can be easily made, i.e., there is the most significant difference, and the corresponding data is processed to determine whether or not the reception device is located, whereby the wireless charging system 1000 can more accurately determine whether to transmit power, thus reducing power consumption.

Figure 4:
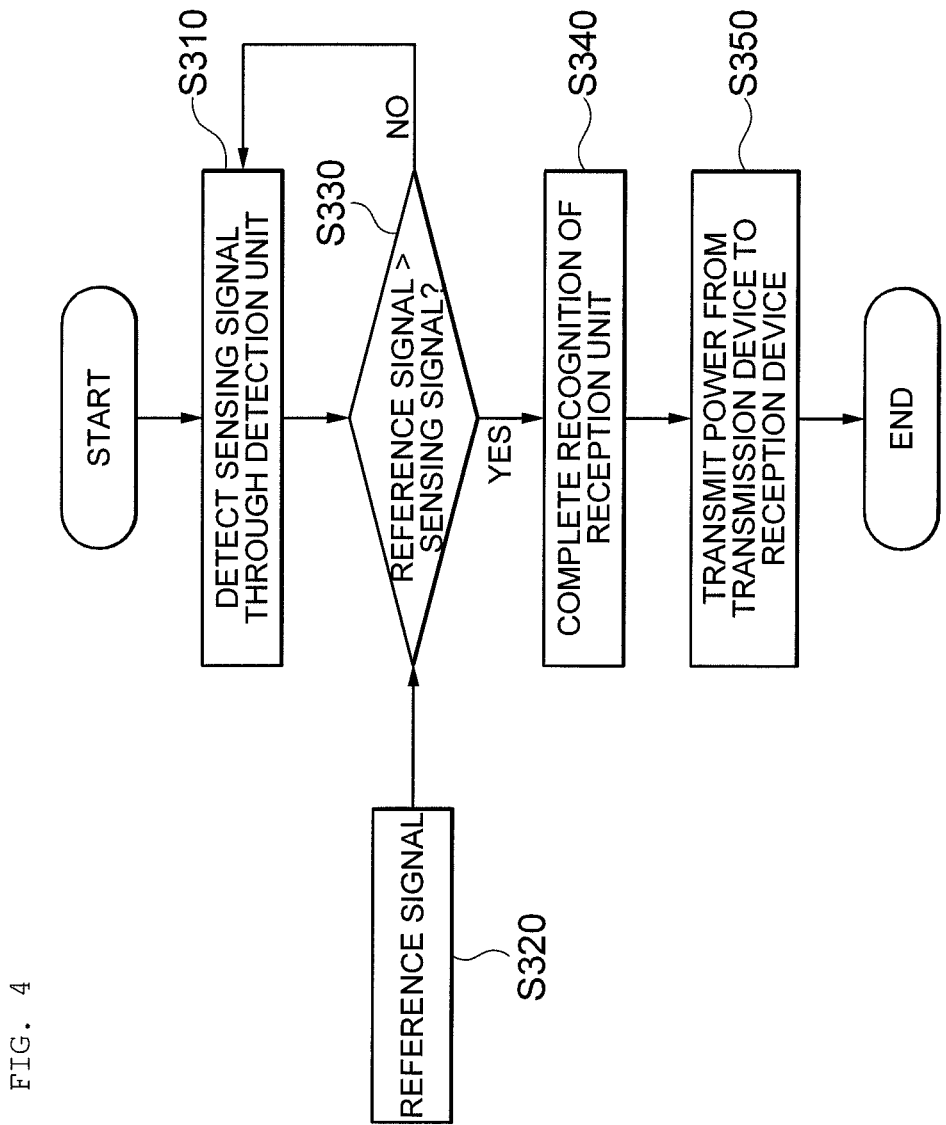
FIG. 4 is a flow chart illustrating a process of a method for determining the presence or absence of a reception device by the wireless charging system according to an exemplary embodiment of the present invention.

FIG. 4 is a flow chart illustrating a process of a method for determining the presence or absence of a reception device by the wireless charging system according to an exemplary embodiment of the present invention.

First, the transmitter controller 130 may compare the sensing signal B applied through the detection unit 140 with a reference signal, and generate the control signal C for controlling the PA driving unit 120 based on the comparison results (S310).

Here, the reference signal is a signal A generated in the transmission device 100 in a state in which the reception device 200 is not present, which may be stored as a default value in the storage unit (132 in FIG. 1) of the transmitter controller 130. The reference signal is a signal arbitrarily set by a designer, which is obtained through experimentation.

In detail, when the sensing signal B applied from the detection unit 140 is greater than the reference signal, the transmitter controller 130 may determine that the reception device is present (S330).

Then, the transmitter controller 130 may generate the first level control signal C for driving the PA driving unit 120 to transmit power to the transmission device 100, and provide the generated first level control signal C to the PA driving unit 120.

Meanwhile, when the sensing signal B applied from the detection unit 140 is smaller than the reference signal, the transmitter controller 130 may determine that the reception device is not present (S330) and may be returned to step 310 to continue to recognize a sensing signal.

In this manner, the wireless charging system 1000 according to an exemplary embodiment of the present invention can measure the amount of current applied from the transmitter coil 150 to the receiver coil 210 through the detection unit 140 and generate the sensing signal B for determining the presence or absence of the reception device.

Accordingly, since the wireless charging system 1000 can accurately determine whether or not the reception device is present or not by comparing the sensing signal B provided from the detection unit 140 through the transmitter controller 130 with the reference signal, power consumption can be reduced.

According to the exemplary embodiments of the present invention, the wireless charging system can generate a sensing signal for determining the presence and absence of the reception device by measuring the amount of current applied from the transmitter coil to the receiver coil through the detection unit.

Thus, the receiver controller of the wireless charging system can accurately determine whether to transmit power by comparing the sensing signal provided from the detection unit with a reference signal, thus reducing power consumption.

Although the preferred exemplary embodiments of the present invention have been disclosed for illustrative purposes, those skilled in the art will appreciate that various modifications, additions and substitutions are possible, without departing from the scope and spirit of the invention as disclosed in the accompanying claims. Accordingly, such modifications, additions and substitutions should also be understood to fall within the scope of the present invention.

What is claimed is:

1. A wireless transmission device, for a wireless charging device, comprising:
    a primary coil;
    a detection unit configured to generate a sensing signal, upon receiving a feedback remaining amount of a current supplied from the primary coil, wherein the feedback remaining amount of the current supplied from the primary coil corresponds to a difference between an amount of a current to be transmitted from the primary coil and an amount of a current that has been transmitted from the primary coil, and wherein the detection unit comprises an isolation unit configured to prevent interference with main power when the feedback remaining amount of current is fed back from the primary coil; and
    a controller configured to:
        determine the presence or absence of the reception device, by comparing the sensing signal with a pre-set reference signal generated during an absence or presence of the reception device, and
        generate a control signal to control a voltage provided to the primary coil, based on the determination of the presence or absence of the reception device.

2. The wireless transmission device according to claim 1, wherein when the feedback remaining amount of current declines, the detection unit is configured to generate a sensing signal indicating that the reception device is present.

3. The wireless transmission device according to claim 1, wherein when the feedback remaining amount of current increases, the detection unit is configured to generate a sensing signal indicating that the reception device is not present.

4. A wireless transmission device, for a wireless charging device, comprising:
    a power source unit configured to generate charging power, by using an external power source, and configured to transmit power via the primary coil;
    a power amplifier (PA) driving unit configured to amplify a high frequency from the charging power generated by the power source unit;
    a detection unit, electrically connected with a primary coil, and configured to generate a sensing signal, upon receiving a feedback remaining amount of a current, wherein the feedback remaining amount of the current corresponds to a difference between an amount of a current to be transmitted from the primary coil and an amount of a current that has been transmitted from the primary coil, and wherein the detection unit comprises an isolation unit configured to prevent interference with main power when the feedback remaining amount of current is fed back from the primary coil; and
    a controller configured to:
        determine the presence or absence of the reception device, by comparing the sensing signal with a pre-set reference signal generated during an absence or presence of the reception device, and
        generate a control signal to drive the PA driving unit, based on the determination of the presence or absence of the reception device.

5. The wireless transmission device according to claim 4, wherein the detection unit further includes:
    a sensing unit connected to the isolation unit, configured to sense the feedback remaining amount of current supplied from the primary coil via the isolation unit, and configured to generate a measurement signal;
    a comparison unit configured to compare a signal provided from the isolation unit, with the measurement signal provided from the sensing unit, to generate a comparison signal; and
    a calculation unit configured to digitalize the comparison signal output from the comparison unit, and configured to generate the sensing signal.

6. The wireless transmission device according to claim 5, wherein the isolation unit includes a transformer.

7. The wireless transmission device according to claim 5, wherein the sensing unit is configured to include a resistor, wherein one end of the resistor is connected with the isolation unit, and the other end of the resistor is connected with any one of the input terminals of the comparison unit.

8. The wireless transmission device according to claim 5, wherein when the feedback remaining amount of current declines, the detection unit is configured to generate a sensing signal indicating that the reception device is present.

9. The wireless transmission device according to claim 5, wherein when the feedback remaining amount of current increases, the detection unit is configured to generate a sensing signal indicating that the reception device is not present.

10. The wireless transmission device according to claim 4, wherein when the sensing signal is smaller than the pre-set reference signal, the controller is configured to recognize that the reception device is present, and is configured to generate a control signal to activate the PA driving unit.

11. The wireless transmission device according to claim 4, wherein when the sensing signal is greater than the pre-set reference signal, the controller is configured to recognize that the reception device is not present, and is configured to generate a control signal to deactivate the PA driving unit.

12. A wireless transmission method, of a wireless charging device, comprising:
   detecting a feedback remaining amount of a current supplied from a primary coil, wherein the feedback remaining amount of the current corresponds to a difference between an amount of a current to be transmitted from the primary coil and an amount of a current that has been transmitted from the primary coil;
   generating a sensing signal based on the feedback remaining amount;
   determining the presence or absence of the reception device, by comparing the sensing signal with a pre-set reference signal generated during an absence or presence of the reception device;
   controlling, based on the determination, a voltage input to the primary coil; and
   preventing interference with main power when the feedback remaining amount of current is fed back from the primary coil.

13. The wireless transmission method according to claim 12, wherein when the feedback remaining amount of current declines, a sensing signal indicating that the reception device is present is generated.

14. The wireless transmission method according to claim 12, wherein when the feedback remaining amount of current increases, a sensing signal indicating that the reception device is not present is generated.

15. The wireless transmission method according to claim 12, wherein when the sensing signal is compared to the pre-set reference signal, and found to be smaller than the pre-set reference signal, the presence of the reception device is recognized, and a control signal to activate the PA driving unit is generated.

16. The wireless transmission method according to claim 12, wherein when the sensing signal is compared to the pre-set reference signal, and found to be greater than the pre-set reference signal, the absence of the reception device is recognized, and the control signal to deactivate a PA driving unit is generated.

* * * * *